R. A. FISH.
FISH HOOK.

No. 77,365. Patented Apr. 28, 1868.

Witnesses:
W. B. Harding
A. P. Marble

Inventor:
Rufus A. Fish

United States Patent Office.

RUFUS A. FISH, OF WORCESTER, MASSACHUSETTS.

Letters Patent No. 77,365, dated April 28, 1868.

FISH-HOOK.

The Schedule referred to in these Letters Patent and making part of the same.

Be it known that I, RUFUS A. FISH, of Worcester, in the county of Worcester, and State of Massachusetts, have invented a new and useful Improvement in Fish-Hooks; and I do hereby declare that the following is a full, clear, and exact description of the construction and operation of the same, reference being had to the annexed drawings, making a part of this specification.

Now, what I desire to secure by Letters Patent, in which—

Figure 1:
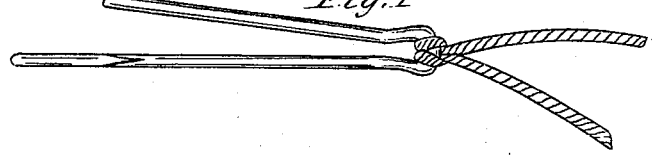
Figure 2:
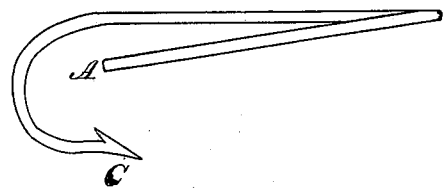
Figure 3:
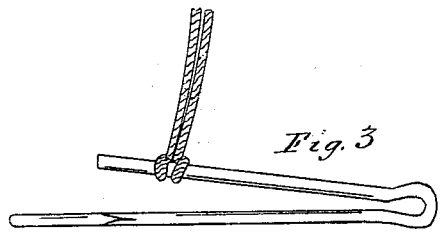

Figure 2 is a perspective view,

Figures 1 and 3 upright sections, is—

1. The method of adjusting the line to the hook, as shown in fig. 3.

2. I claim leaving the end of the wire A in such position that by pressure it will turn the point of the hook C either up or down, causing it to hook the fish either in the upper or lower jaw, thus overcoming the difficulty of the old-style hook, which often slips flatwise from the mouth of the fish without hooking, constructed substantially and for the purpose shown and described.

RUFUS A. FISH.

Witnesses:
    W. B. HARDING,
    A. P. MARBLE.